US009959222B2

United States Patent
Chen et al.

(10) Patent No.: US 9,959,222 B2
(45) Date of Patent: May 1, 2018

(54) IN-BAND CONFIGURATION MODE

(71) Applicant: Intel Corporation, Santa Clara, CA (US)

(72) Inventors: Huimin Chen, Portland, OR (US); Keith A. Jones, DuPont, WA (US); John L. Baudrexl, Olympia, WA (US); Ronald W. Swartz, Granite Bay, CA (US); Vui Yong Liew, Bukit Mertajam (MY)

(73) Assignee: Intel Corporation, Santa Clara, CA (US)

( * ) Notice: Subject to any disclaimer, the term of this patent is extended or adjusted under 35 U.S.C. 154(b) by 432 days.

(21) Appl. No.: 14/498,474

(22) Filed: Sep. 26, 2014

(65) Prior Publication Data

US 2016/0092381 A1     Mar. 31, 2016

(51) Int. Cl.
G06F 13/22     (2006.01)
G06F 13/42     (2006.01)
G06F 13/40     (2006.01)

(52) U.S. Cl.
CPC .......... *G06F 13/22* (2013.01); *G06F 13/4054* (2013.01); *G06F 13/4286* (2013.01)

(58) Field of Classification Search
CPC .. G06F 13/385; G06F 13/387; G06F 13/4286; G06F 13/4054; H04L 29/06; H04L 69/18
See application file for complete search history.

(56) References Cited

U.S. PATENT DOCUMENTS

| 2007/0159998 A1* | 7/2007 | Ruuska | H04L 12/66 370/328 |
| 2009/0047991 A1* | 2/2009 | Elg | H04W 52/0293 455/552.1 |
| 2015/0363350 A1* | 12/2015 | Yeung | G06F 13/4221 710/106 |

OTHER PUBLICATIONS

Universal Serial Bus 3.0 Specification, Revision 1.0, Nov. 12, 2008.*

* cited by examiner

*Primary Examiner* — Farley Abad
(74) *Attorney, Agent, or Firm* — Alliance IP, LLC

(57) ABSTRACT

A first state of an interconnect protocol is entered. A particular signal is sent according to the protocol to a device over a link. During the first state, it is detected that a response to the particular signal is received in the first state. It is determined that the device supports a configuration mode outside the protocol based on the received response. The configuration mode is entered based on the response. One or more in-band configuration messages are sent within the configuration mode.

21 Claims, 17 Drawing Sheets

IN-BAND CONFIGURATION MODE

FIELD

This disclosure pertains to computing systems, and in particular (but not exclusively) to computing system interconnects.

BACKGROUND

In many of today's processing systems, such as personal computer (PC) systems, there exist ports for connecting various devices. Some of these devices are frequently used by PC users. For example, some devices can connect to system using a Universal Serial Bus (USB) port. Such USB devices may be printers, compact disk read-only-memory (CD-ROM) drives, CD-ROM Writer (CDRW) drives, digital versatile disk (DVD) drives, cameras, pointing devices (e.g., computer mouse), keyboards, joy-sticks, hard-drives, speakers, among other examples. Some of these devices use more of the available USB bandwidth than others. For example, a USB CDRW is a high bandwidth device, while human interface devices (HID), such as computer mice, keyboards and joysticks, are low bandwidth devices.

Different standards of USB technology have different capabilities and support different maximum bandwidths. For example, Universal Serial Bus Specification, revision 1.1, September 1998 (USB 1.1) devices are capable of operating at 12 Mbits/second (Mbps), and Universal Serial Bus Specification, revision 2.0, April 2000 (USB 2.0; also known as high-speed USB) devices are capable of operating at 480 Mbps. More recently, Universal Serial Bus Specification, revision 3.0 was introduced (in August 2008) capable of operating at 5.0 Gbits/second (Gbps) and was updated further in Universal Serial Bus Specification, revision 3.1 in July 2013 to support operation at 10.0 Gbps.

DETAILED DESCRIPTION

Figure 1:
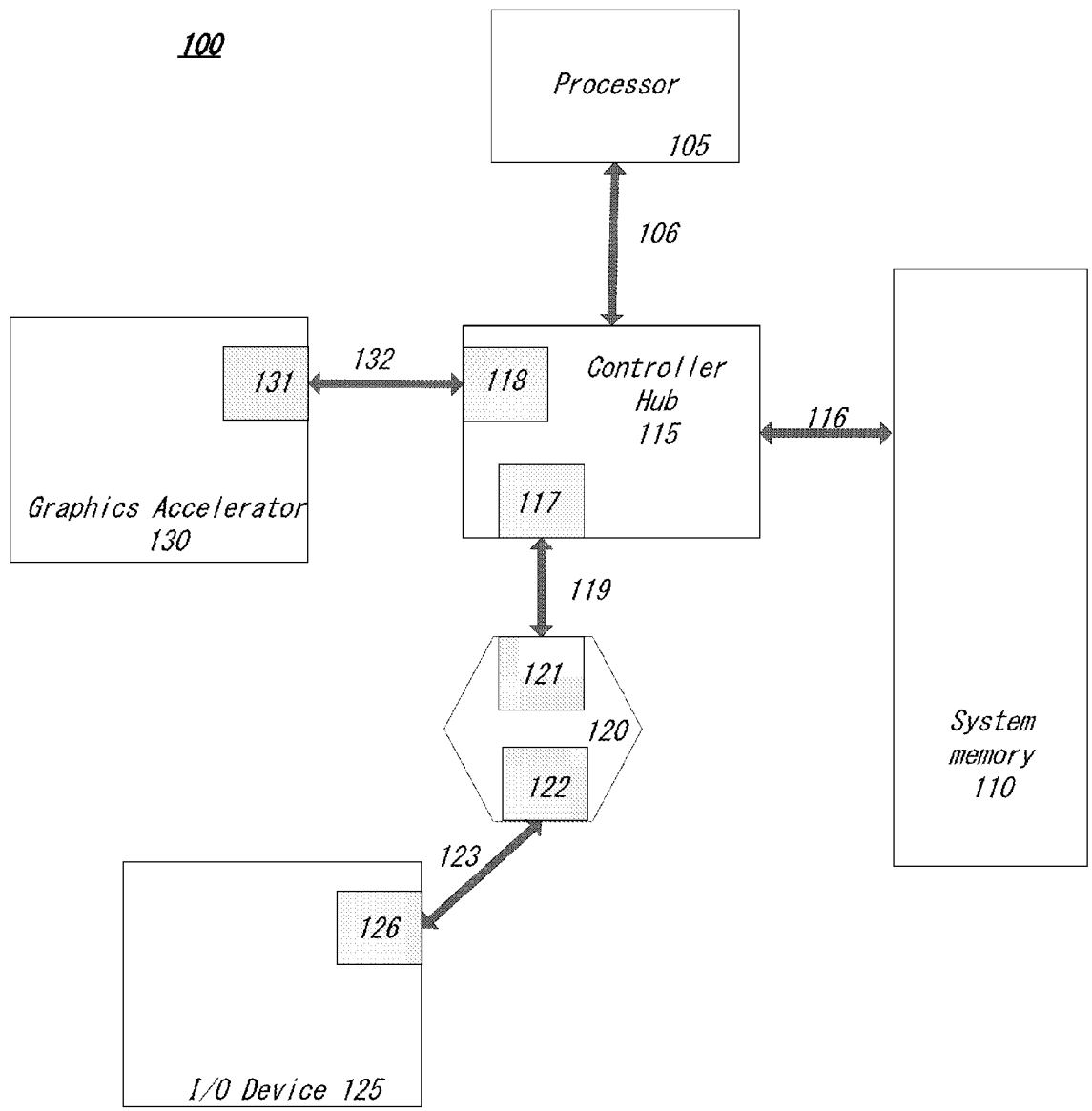
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the subject matter of the present Specification. It will be apparent, however, to one skilled in the art that these specific details need not be employed to practice the methods, apparatus, articles, and systems, etc. described in the present Specification. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the discussion of the subject matter of the present Specification.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. While some specific examples of interconnect architectures are named and discussed below, it should be appreciated that the principles described in this Specification can potentially be applied to a number of other, unnamed, and yet to be formalized interconnect architectures, which would potentially also benefit from aspects of the subject matter described herein.

Examples of interconnect architectures and technologies include the Universal Serial Bus (USB standard, Peripheral Component Interconnect (PCI), Peripheral Component Interconnect (PCI) Express (PCIe), Quick Path Interconnect (QPI), High Performance Interconnect (HPI) (e.g., a serial point-to-point differential protocol with embedded clock), Infiniband, and Advanced Microcontroller Bus Architecture (AMBA) AXI architectures, among other examples. A primary goal of at least some interconnect architectures is to enable components and devices from different vendors to inter-operate in an open architecture, spanning multiple market segments; hosts, peripherals, Clients (Desktops and Mobile), Servers (Standard and Enterprise), and Embedded and Communication devices.

Referring to FIG. 1, an embodiment of a fabric composed of point-to-point Links that interconnect a set of components is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in an interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual bridge devices, such as PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. In some examples, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105.

Figure 2:
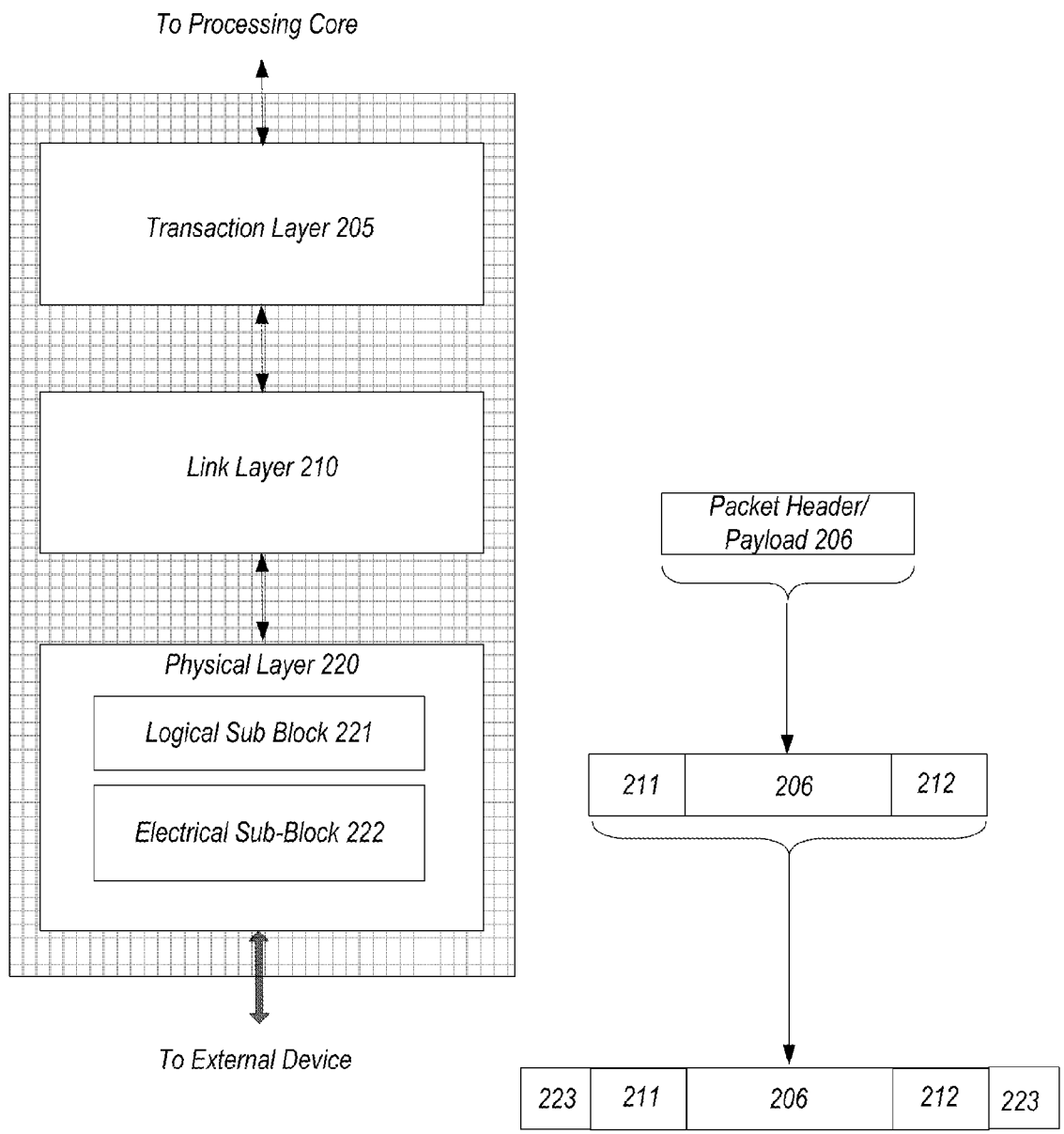
FIG. 2 illustrates an embodiment of a interconnect architecture including a layered stack.

Turning to FIG. 2 an embodiment of a layered protocol stack is illustrated. Layered protocol stack 200 includes any form of a layered communication stack. In one embodiment, protocol stack 200 includes a transaction or protocol layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

Interconnect protocols can use packets to communicate information between components. In some examples, packets can be formed in the Transaction Layer 205 and Data Link Layer 210 to carry the information from the transmitting component to the receiving component. As the transmitted packets flow through the other layers, they can be extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). Therefore, in one embodiment, transaction layer 205 assembles packet header/payload 206. Further, in some implementations, the transaction layer 205 can provide additional feature such as flow control, such as by managing credit-base flow control for TLPs. Split transactions can also be implemented, i.e. transactions with request and response separated by time, allowing a link to carry other traffic while the target device gathers data for the response, among other examples.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code 212, (e.g., CRC), and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221 to perform physical layer functions on the data.

As stated above, although transaction layer 205, link layer 210, and physical layer 220 are discussed in reference to a specific embodiment of an example protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer.

Figure 3:
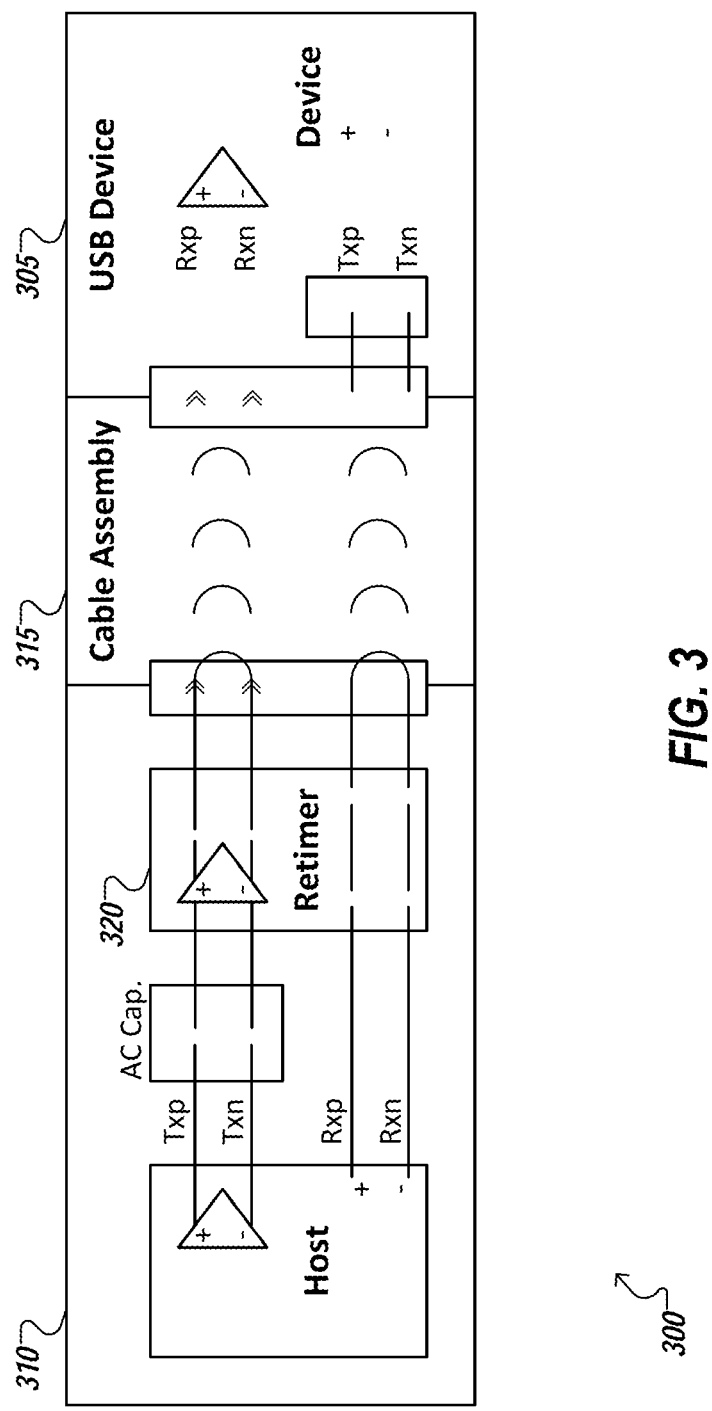
FIG. 3 illustrates an embodiment of a link topology including at least one retimer device.

Logic can be provided, in hardware and/or software, that enables at least two devices communicatively coupled by an interconnect to perform pre-configuration and system control tasks, for instance, at the physical layer. In one example, the two devices can include a host device and another device coupled to the host, such as another system block, integrated chip (IC), or peripheral device, among other examples. In another example, the two devices can include a host or device and a retimer or redriver device used to lengthen a channel between the host and device. FIG. 3 shows a simplified block diagram 300 of a link topology that includes a device 305 connected to a host 310 through a cable assembly 315 and a retimer 320. In some use cases, retimers (e.g., 320) can be beneficial where high link speeds complicate longer channel lengths (e.g., due to increased channel attenuation) between devices, the retimer used to achieve the length desired even in high speed applications, among other examples. The host, device, and retimer c In one example, an operation state machine can be defined for configuring and training links between the host, device, retimer, and other components. Additional configuration and system control tasks may also be desired, such as negotiating the transmitter and receiver equalization coefficients and settings, establishing the link data rate, entering low power states, and entering test mode (such as a loopback mode), among other potential examples and uses. In one implementation, a configuration mode can be defined that allows the two or more devices to perform tasks relating to link configuration and system control. The configuration mode can enable the sending of messages between the devices in order to perform configuration tasks. The configuration mode can be outside the defined base protocol(s) utilized for in-band communication on the link. Further, these out-of-protocol configuration mode messages can be sent in-band on the same channel while configuration mode is active and can adopt another different custom or proprietary protocol or format for the communications to perform the configuration tasks.

While the configuration mode may be external to a defined interconnect protocol for the link, entry to or exit from the configuration mode can utilize signals defined in the interconnect protocol, albeit for a different purpose, such that the signal detection logic of the devices can be reused without defining a new signal to support entry or exit into a new non-base protocol configuration mode. For instance, a signal defined within the interconnect protocol for use specifically within one or more particular states (in the state machine defined for the protocol), can be reused within a different state of the state machine to enter (and/or exit) the new configuration state. Further, backward compatibility can be preserved, such that support of the new configuration state is effectively optional, among other features.

In one specific example, a configuration mode can be added to the Universal Serial Bus (USB) protocol. For instance, the USB 3.1 standard can be augmented to include a non-USB configuration mode to support non-USB related communications between two ports with no additional sideband signals or additional transceiver changes. The configuration mode can be backward compatible to other USB standards, such as USB 3.0. While other solutions utilize side-band signaling for entry into specialized modes, the non-USB configuration mode can be entered using in-band signals and the configuration communications can also occur in-band. This can allow the additional pins and complexity of sideband signaling to be foregone. Additionally, existing signals defined in USB 3.1 can be re-used within one or more USB 3.1 states to trigger entry into the non-USB configuration mode. Accordingly, in-band handshakes can be provided without adding transceivers and the corresponding circuitry.

Communication can be initiated between two USB ports, such as a host USB port, a device USB post, or retimer port. In one example, entry into the non-USB configuration mode can be entered from a USB 3.1 state, such as an Rx.Detect or Polling state of either a link training state (e.g., Link Training and Status State Machine (LTSSM)) or retimer training state (e.g., Retimer Training and Status State Machine (RTSSM)). A device can listen for a particular signal while in the specified state. Detection of the signal can be enabled even when the device's own receiver termination is disabled, allowing the link partner to remain in a detect state, such as Rx.Detect. If a USB port is equipped to support the non-USB configuration mode, it will also interpret detection of the signal as a request to enter the non-USB configuration mode. Upon entering the non-USB configuration mode, the two USB port will be able to exchange non-USB related information for various system control and configuration. However, if a USB port is not equipped with this capability, it can ignore (or otherwise not identify the signal as a request to enter the non-USB configuration mode) and can remain in a detect state (e.g., Rx.Detect) while continuing to perform far-end receiver termination detection per the standard definition (e.g., as defined in USB 3.0 or 3.1).

In one example, the existing USB 3.1 signal leveraged for use as an entry signal for a non-USB configuration mode can be a signal based on Low Frequency Periodic Signal (LFPS). For instance, a USB-compliant standard can define a LFPS-based pulse width modulation (PWM) signal (LBPS) or LFPS-based PWM message (LBPM). Such signals have been defined for use in some polling sub-states, such as Polling.PortMatch to announce a port's capability and Polling.PortConfig to indicate that a port is ready for eSS training, among other examples. Using LBPMs in other LTSSM/RTSSM states, such as Rx.Detect, or even Polling.LFPS can extend the LBPM usage (e.g., already supported by USB 3.1-compliant devices) for entry into a new non-USB configuration mode without causing issues with backwards compatibility.

Figure 4A:
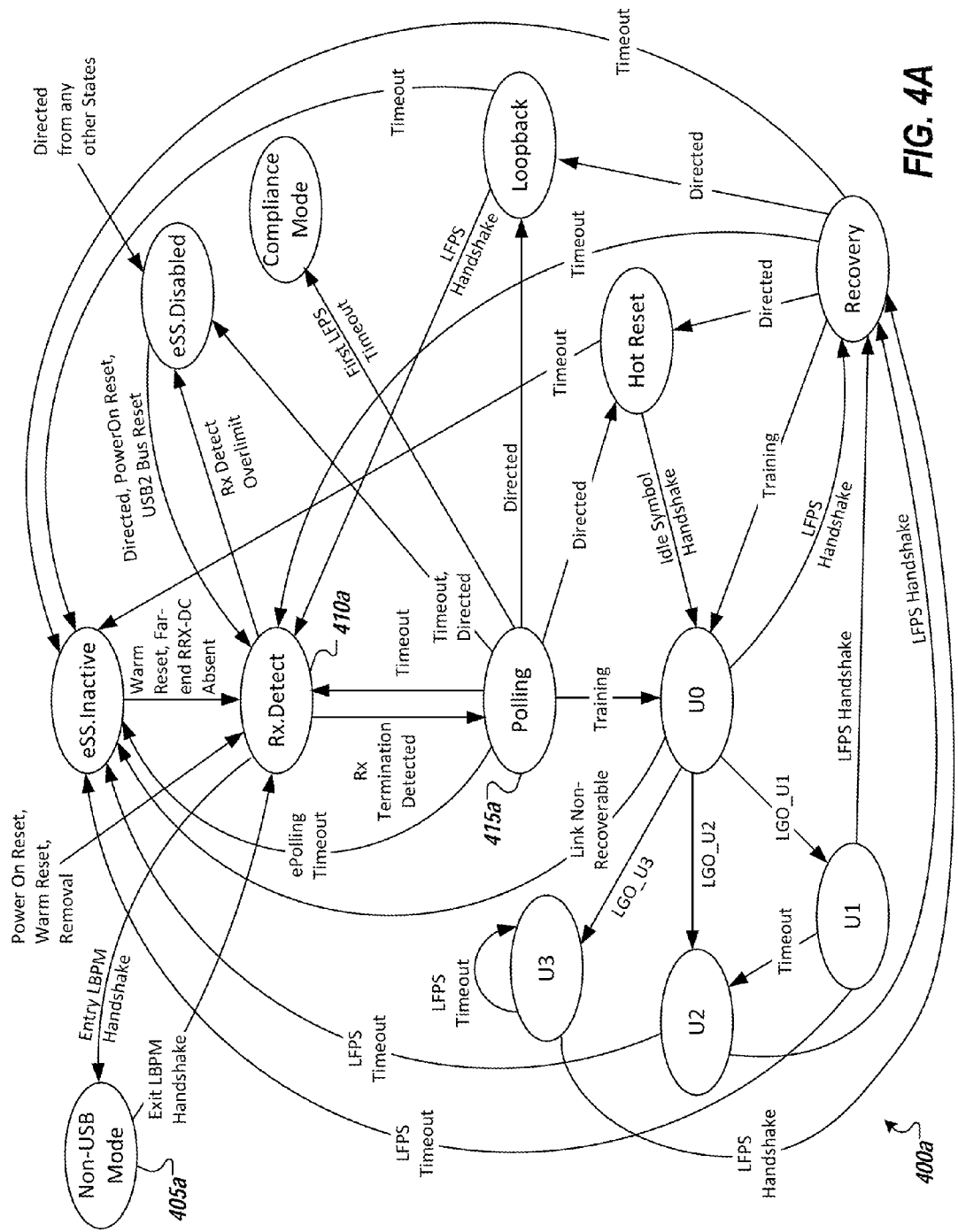
FIG. 4A illustrates a first example embodiment of a link training and status state machine (LTSSM) that includes a configuration mode outside of normal interconnect operation.

Turning now to FIG. 4A, a portion of an example implementation of the USB 3.1 Link Training and Status State Machine (LTSSM) (400a) is illustrated that includes a new non-USB configuration mode (e.g., 405a). Operation of a USB host or device port can start, at power-on, in the Rx.Detect state 410a. During Rx.Detect, a port can turn on its receiver termination to indicate its presence to a link partner device and, at the same time, attempt to detect the presence of the link partner device by performing far-end receiver termination. If a far-end receiver termination is detected, the port can exit from the Rx.Detect state and proceed to Polling state 415a for subsequent link training and operation. Further, in this example, receipt of a LBPM can be detected and determined to correspond to an attempt, by the link partner device to enter a non-USB mode 405a (allowing for non-USB communications, including communications related to system and link configuration and control).

A LBPM signal received during Rx.Detect can indicate both that a device supports a non-USB mode 405a and wishes to enter the non-USB mode 405a. Additionally, a handshake can be defined between the two link partners to ensure entry to the non-USB mode 405a. For example, an initiating device can send an LBPM and listen for a response from its link partner device. The receiving device, if it supports the non-USB mode 405a, will recognize the received LBPM and can send a response back indicating receipt of the LBPM and support of the LBPM by the receiving device. In some cases, the receiving device can reply to a received LBPM by echoing the LBPM (or providing a different LBPM) in-band to the initiating device. When the initiating device receives the response, it can identify both that its link partner also supports the non-USB mode 405a and enter the non-USB mode 405a.

Indeed, as illustrated in the example of FIG. 4A, upon power on and entry to Rx.Detect, if a port is to initiate non-USB operation (e.g., to perform various pre-configuration tasks), it can keep its receiver termination disabled, and perform the far-end receiver termination as defined by the protocol specification. Upon detecting the far-end receiver termination, indicating the presence of its link partner, the port, while keeping its receiver termination disabled, can transmit an LBPM to attempt to enter, with the link partner, into the non-USB mode. Upon completing the LBPM message transmission, the port can proceed (per the protocol specification) to enable its receiver termination and can then monitor the channel for an acknowledgment from its link partner. If its link partner is not equipped with the capability to support the non-USB configuration mode, the link partner can complete activities within the Rx.Detect state, detect the far-end receiver termination, and then exit Rx.Detect and enter Polling by transmitting Polling.LFPS bursts defined by the standard. The other port, upon detecting a Polling state signal (e.g., Polling.LFPS signal), instead of an acknowledgement of entry into the non-USB state, can also enter Polling for USB operation. If, however, the link partner supports the non-USB mode, it can respond to the LBPM with an acknowledgement message (e.g., a specific LBPM message that is different from Polling.LFPS burst) to acknowledge that the non-USB communication is granted. The two ports can then enter the non-USB mode to start the non USB communications. In non-USB mode, the two ports can exchange messages with each other, either based on LBPM, or even eSS signals defined by the standard, among other example messaging techniques. Once the communication concludes, the participating ports can exchange an exit handshake (e.g., using a corresponding LBPM), and the ports can re-enter and conclude activities within Rx.Detect before continuing with link training in accordance with the LTSSM (e.g., by entering Polling to resume USB operation). In some cases, a signal (e.g., Polling.LFPS) can be received immediately following the exit from the non-USB mode to cause the devices to transitions then directly to the Polling mode, among other examples.

Figure 4B:
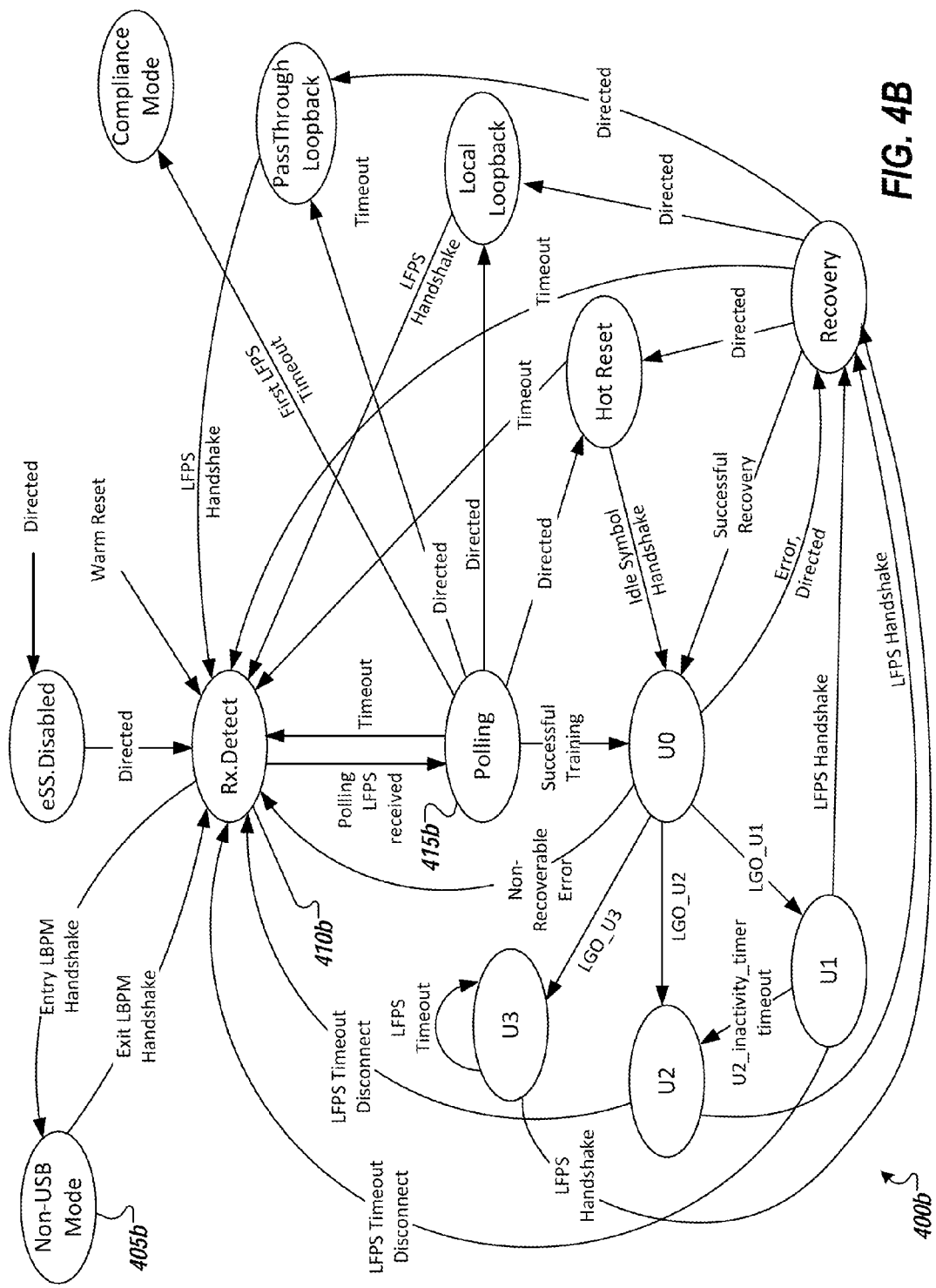
FIG. 4B illustrates a first example embodiment of a retimer training and status state machine (RTSSM) that includes a configuration mode outside of normal interconnect operation.

Additional or alternative operation state machines can be augmented to support a non-USB configuration mode. Retimers can be make beneficial use of the pre-configuration messaging and tasks facilitated through a non-USB configuration mode. Indeed, FIG. 4B shows a representation 405b of at least a portion of a Retimer Training and Status State Machine (RTSSM) that includes the new non-USB configuration mode (e.g., 405b). As with link training (e.g., between a host and device), an existing signal defined in the USB specification can be re-used within one or more particular operation states (of RTSSM), such that receipt of the signal is to invite another device (e.g., a retimer) to enter a non-USB configuration mode 405b. In the particular example of FIG. 4B, a Rx.Detect state 410b can also be designated as a state in which a non-USB mode 405b can be launched using a particular signal, such as an LBPM, for at least a portion of the handshake between a retimer and another device (e.g., even another retimer). Other signals can also be used provided they do not have an alternative USB-specific use within the state from which non-USB is to be launched.

In one example, a retimer can transition from a disabled (e.g., eSS.Disabled) state to Rx.Detect 410b. During Rx.Detect 410b, the retimer, if it supports the non-USB configuration mode 405b, can listen for the designated signal for entering the non-USB mode 405b, in this case a LBPM. If an LBPM is received, and the retimer supports the non-USB mode, the retimer can reply back with a signal (such as an LBPM) to indicate that it supports the non-USB mode and will enter the non-USB mode based on receipt of the LBPM. The devices can then exchange non-USB compliant messages with each other, as in the previous example, to perform various configuration (and pre-configuration) and control tasks that might not otherwise be supported or defined within the base USB interconnect architecture. A handshake can also be used to cause the partner devices to exit the non-USB mode 405b and re-enter normal USB operation, in this case returning to the Rx.Detect state 410b to complete operations there and transition to a next state (e.g., a Polling or other link training state (e.g., 415b)).

If a device does not support the non-USB mode and receives an LBPM from its partner device, the device can simply ignore the LBPM. Indeed, devices not compliant with USB 3.1 (or a later version of the standard) that are nonetheless compliant with earlier versions of the USB specification (e.g., USB 3.0) may not include functionality for recognizing LBPMs (or other later USB version signals) in any instance. As a result, a device that does not support the non-USB mode will not provide a reply to a request to enter the non-USB mode that causes the devices to enter the mode. Failure to provide such a reply can effectively serve as notice, from the device that it does not support the non-USB mode. The device sending the LBPM can maintain a timer or use other logic to detect a timeout condition or non-reply to the LBPM. The timeout (or other non-reply) can cause the device, which sent the LBPM, to conclude that the recipient partner device does not support the non-USB mode. This device can then function under the presumption that non-USB mode is not supported by its partner device on the link and can proceed through the state machine in accordance with this presumption. In this manner, backward compatibility can be maintained with the existing USB 3.0 or USB 3.1 port not supporting non-USB Mode.

Figure 5A:
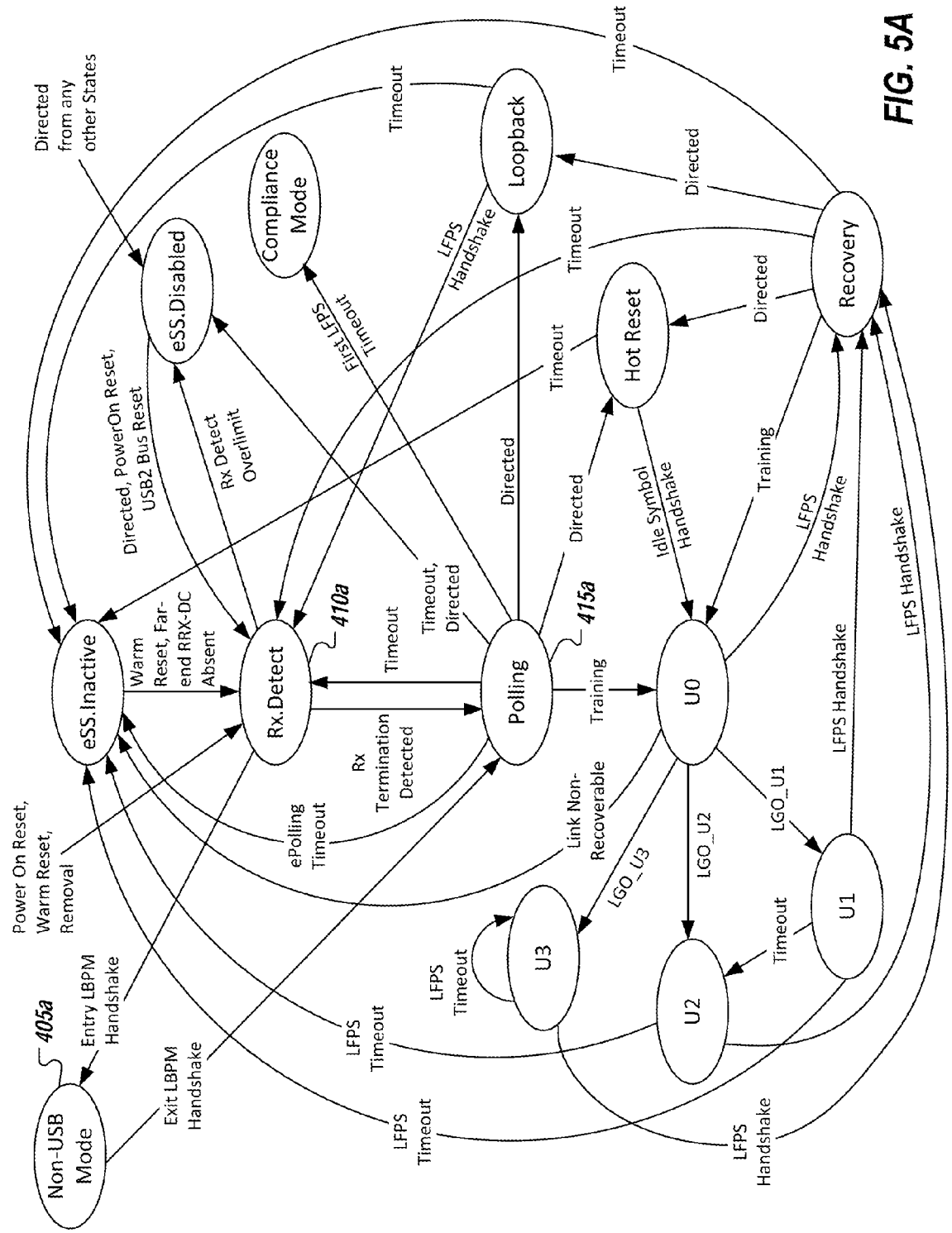
FIG. 5A illustrates a second example embodiment of a LTSSM that includes a configuration mode outside of normal interconnect operation.
Figure 5B:
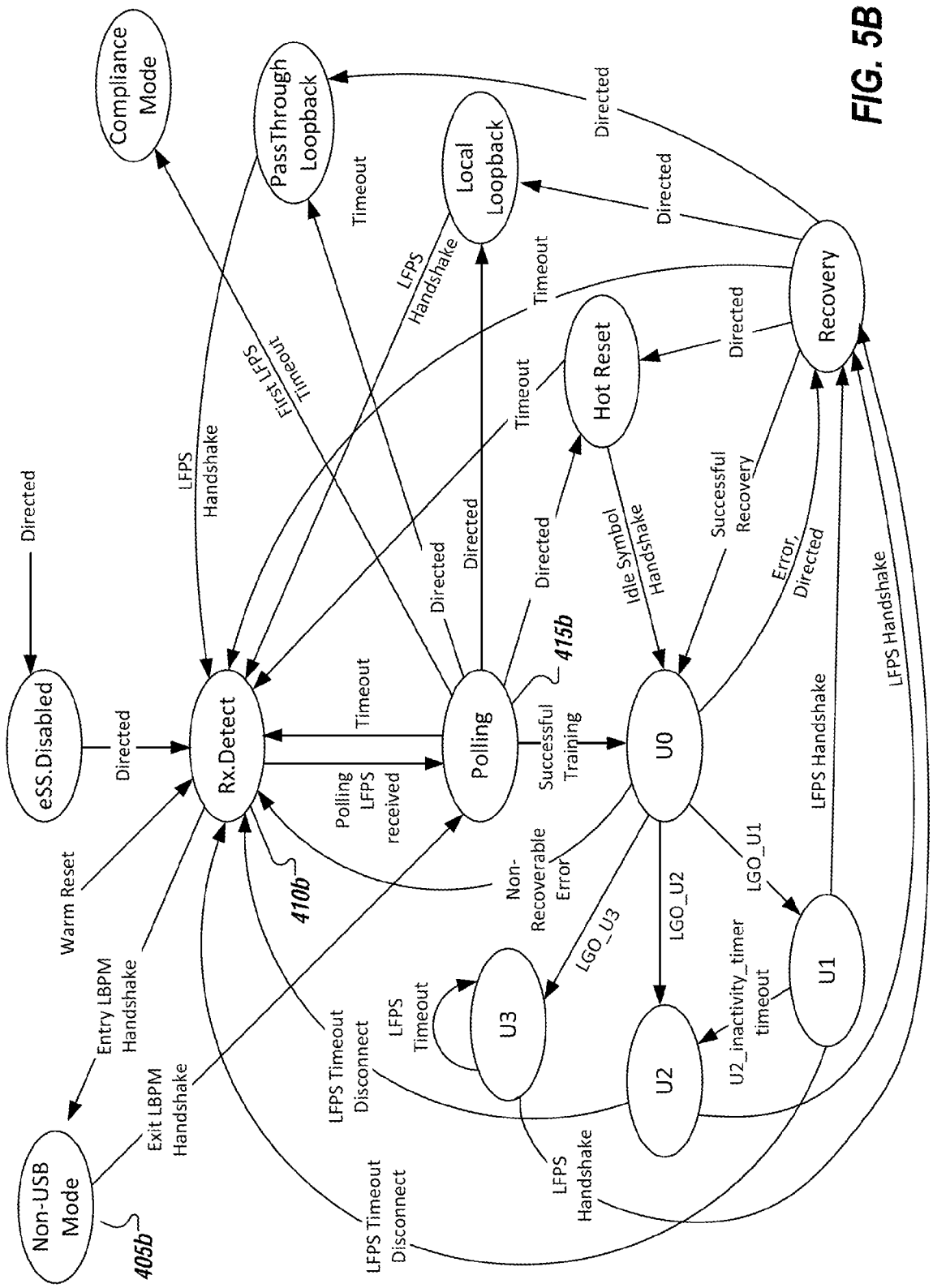
FIG. 5B illustrates a second example embodiment of a RTSSM that includes a configuration mode outside of normal interconnect operation.

In some embodiments, a non-USB mode can be entered from alternative or additional states of an operation state machine of USB, such as LTSSM and RTSSM. FIGS. 5A-5B provide an example where a non-USB mode can be entered (by interconnected devices) between a detect state (e.g., Rx.Detect 410a, 410b) and a polling state (e.g., Polling 415a, 415b). For instance, in FIG. 5A, a particular message can be defined and expected within normal USB operation to transition from Rx.Detect 410a to Polling 410b. For instance, a Polling.LFPS signal can be defined to indicate and coordinate the transition from Rx.Detect to Polling between two interconnected devices. In one embodiment, devices configured to support a non-USB configuration mode (e.g., 405a) can additionally interpret another alternate signal (e.g., a LBPM), sent instead of the Polling.LFPS signal to indicate that the devices (if they both support the mode) are to enter the non-USB mode 405a. If the device receiving the LBPM does not provide a reply to complete the LBPM handshake and enter the non-USB mode, the device sending the LBPM can conclude that the partner device does not support the non-USB mode, and operation can revert to normal USB state transitions, for instance, with the sending device sending a Polling.LFPS signal to enter a Polling state 415a directly in response to determining that its partner device does not support non-USB mode. FIG. 5B illustrates an analogous state machine for retimer training (e.g., according to RTSSM), where an LBPM received following the end of an Rx.Detect state in lieu of an expected Polling.LFPS signal can serve as the mechanism to enter non-USB mode 405b. Note that an LBPM is based on LFPS. In some implementations, a port that does not support non-USB Mode, when it has received an LBPM, will discard it as if it had received a corrupted Polling.LFPS (and will thereafter continue the detect for the expected Polling.LFPS, thereby preserving backwards compatibility).

Figure 6A:
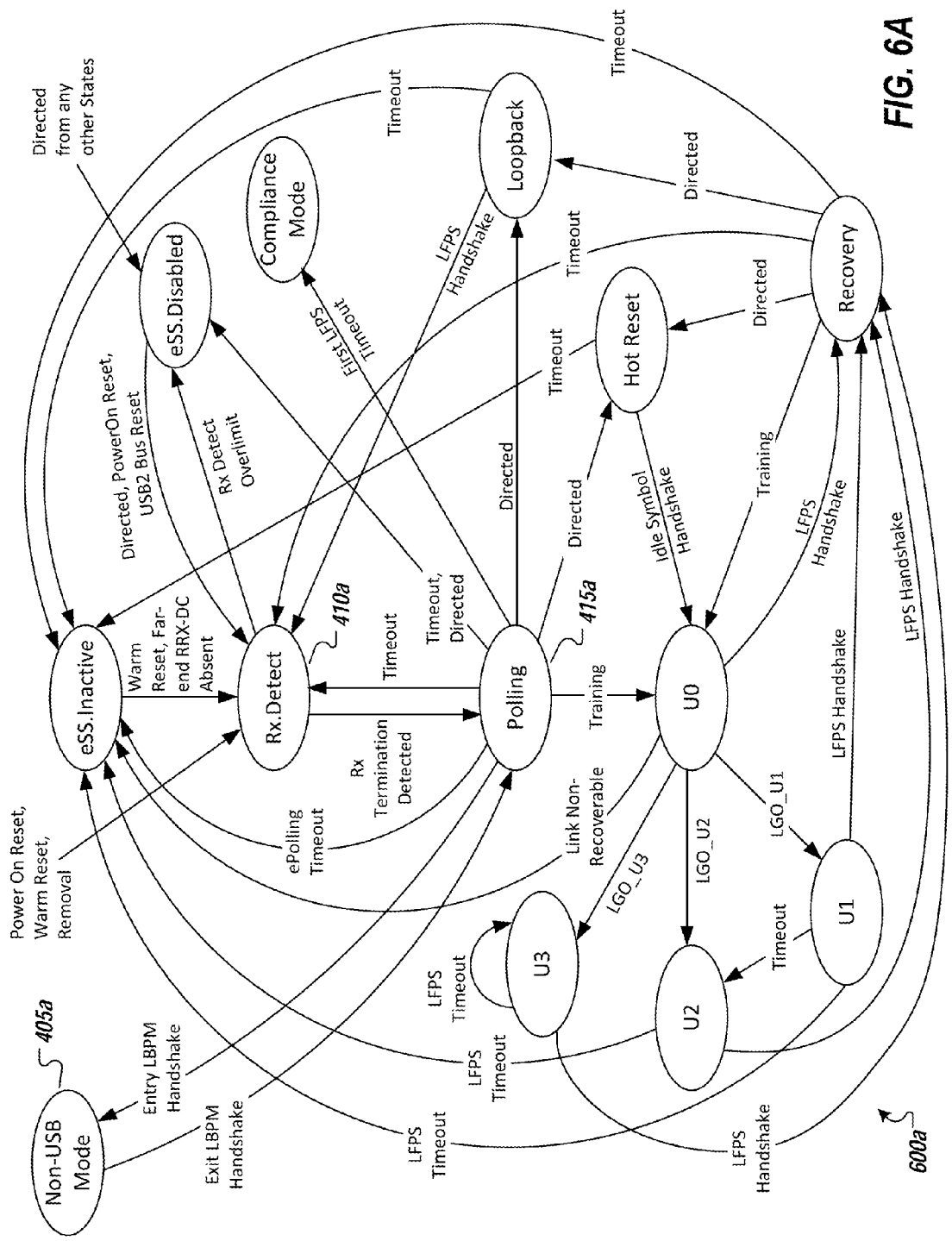
FIG. 6A illustrates a third example embodiment of a LTSSM that includes a configuration mode outside of normal interconnect operation.
Figure 6B:
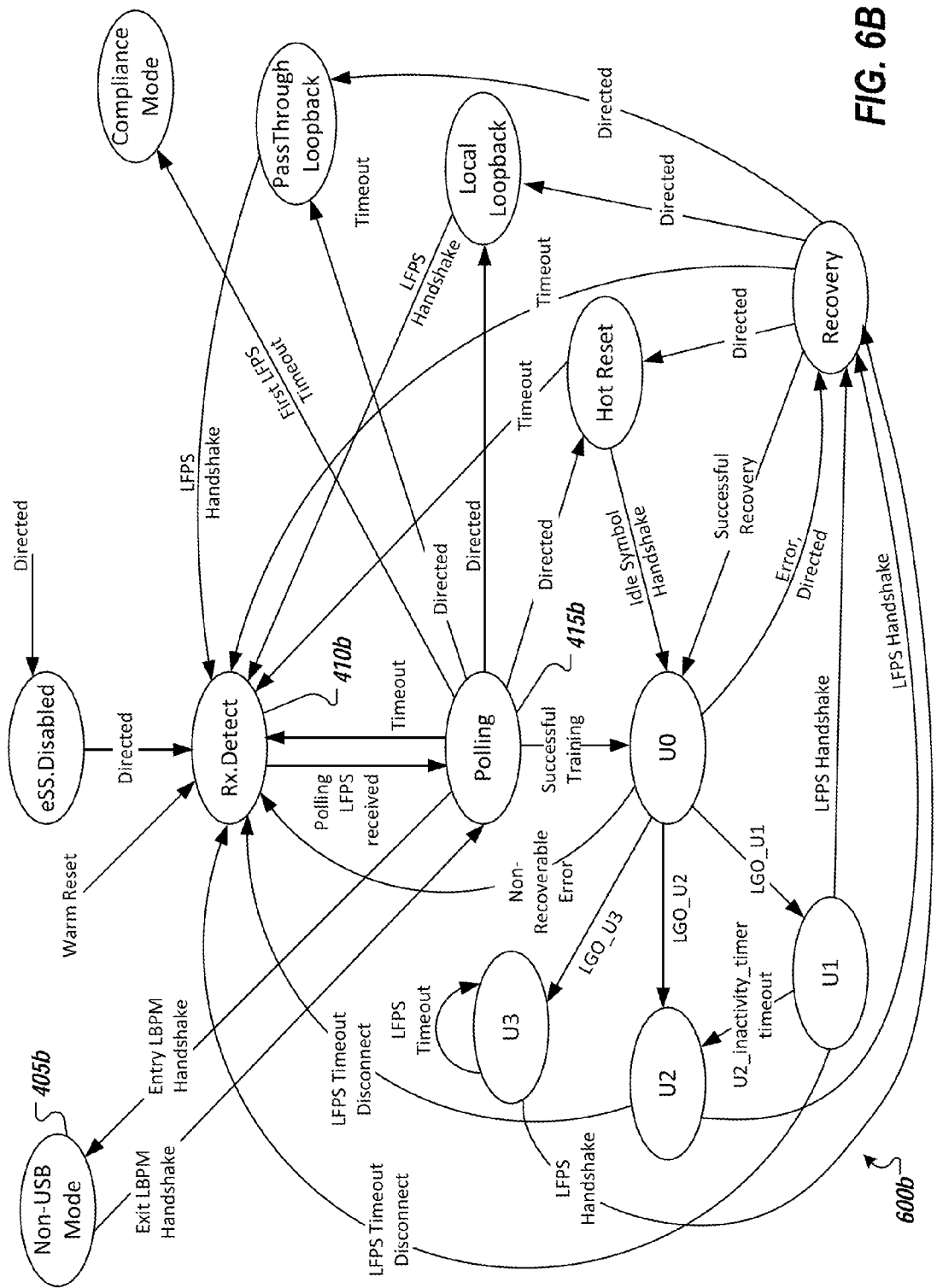
FIG. 6B illustrates a third example embodiment of a RTSSM that includes a configuration mode outside of normal interconnect operation.

A non-USB mode can be launched from still other states in an operation state machine. For instance, in the example state machine diagrams 600a-b of FIGS. 6A-6B, a non-USB mode can alternatively (or additionally) be launched from a polling mode, such as the Polling state 415a,b of USB 3.1. An LBPM or other signal not otherwise utilized in the Polling state (or a corresponding sub-state of Polling 415a, b) can be designated to cause a transition from Polling to a non-USB mode 405a,b to permit the sending of non-USB signals in-band between the devices. For instance, upon entering a polling mode, receiving a pre-defined signal (already provided in USB but for other uses in other states (or sub-states)) can be designated to indicate entry into the non-USB mode. As in other embodiments, failure of a receiving device to support the non-USB mode can cause the non-USB mode entry signal (e.g., an LBPM) to be ignored causing the linked partner devices to proceed instead with normal USB operation. If the non-USB mode is supported the LBPM can be replied (e.g., within another LBPM) to complete the handshake and cause the devices to enter the non-USB mode. Upon completing the non-USB communications within the non-USB mode, the devices can exit the non-USB mode (e.g., using a LBPM exit handshake) return to the polling mode to complete normal USB link training activities.

Figure 7A:
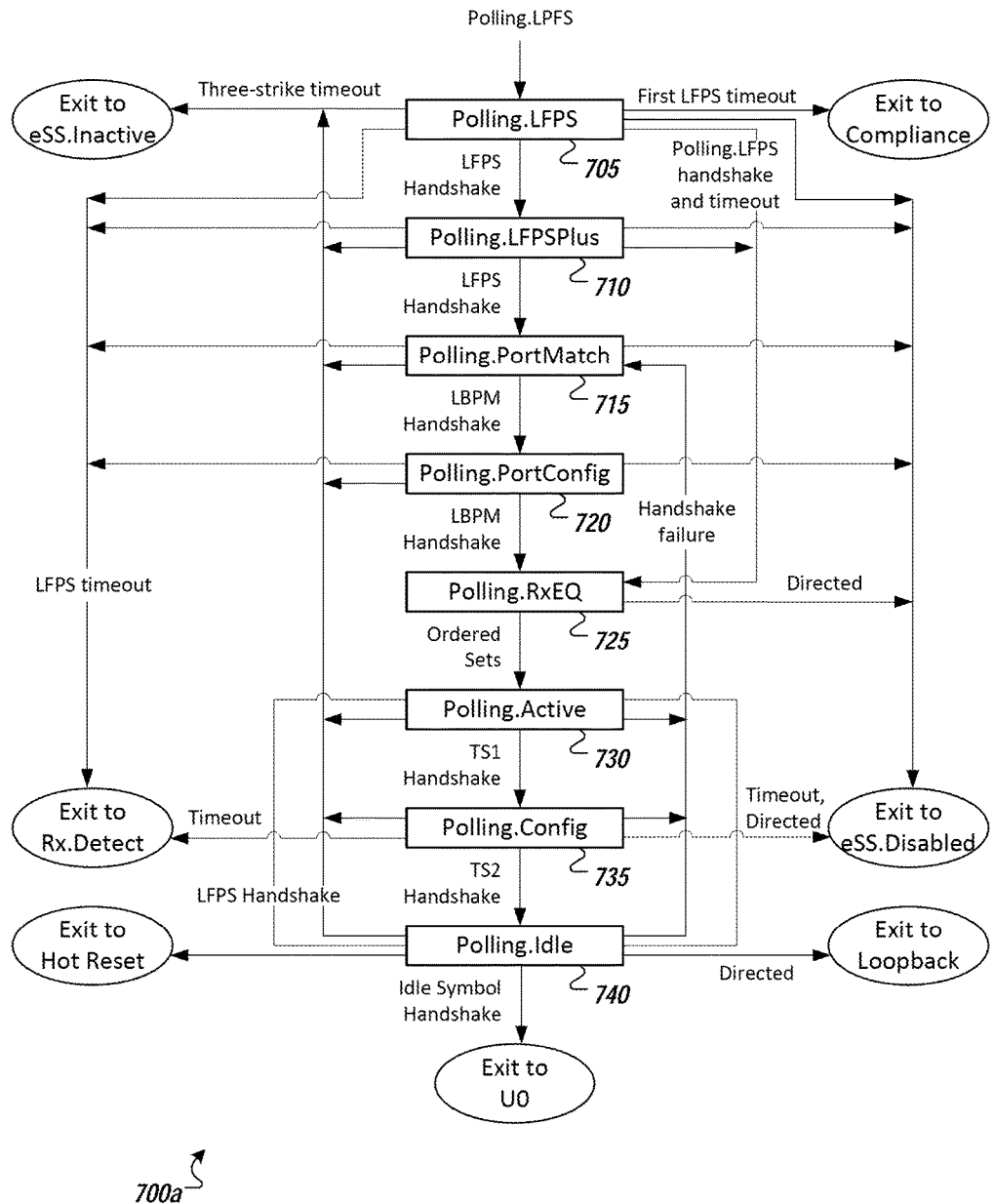
FIG. 7A illustrates an embodiment of a state machine for sub-states of a polling state in a LTSSM.

In some implementations, non-USB mode entry can be provided by (or restricted to) a particular sub-state of the polling state. For instance, in a Polling state 415a of LTSSM can include multiple polling sub-states, and one or more of these sub-states can be designated as supporting entry to a non-USB mode. For instance, FIG. 7A illustrates a portion of a detailed state machine 700a for sub-states 705, 710, 715, 720, 725, 730, 735, 740 within a Polling state 415a. Sub-states can utilize various signals to perform their corresponding link training activities or transition between sub-states. In some cases, the signals used in USB polling sub-states can include LBPM signals (such as in sub-states Polling.PortMatch, Polling.PortConfig, etc.). In one example, a subset of the Polling sub-states can designated from which a non-USB mode can be entered and/or exited. In one implementation, LBPM is used for a handshake to facilitate entry and exit to the non-USB mode within at least a particular one of the polling sub-states that does not also use LBPM. In one implementation (not explicitly illustrated in FIG. 7A), the polling sub-state that is designated to facilitate entry and exit to the non-USB mode can be a first sub-state of the Polling state 415a (e.g., Polling.LFPS (705)). For instance, rather than receiving a LFPS signal, an LBPM can be received to indicate a request to enter the non-USB mode with the partner device. If supported, the non-USB mode can be entered. If the non-USB mode is not supported, or upon exit from the non-USB mode, normal USB operation can continue (e.g., either from the same sub-state (Polling.LPFS) or by immediately transitioning to the next Polling sub-state (Polling.LFPSPlus or Polling.RxEQ)).

Figure 7B:
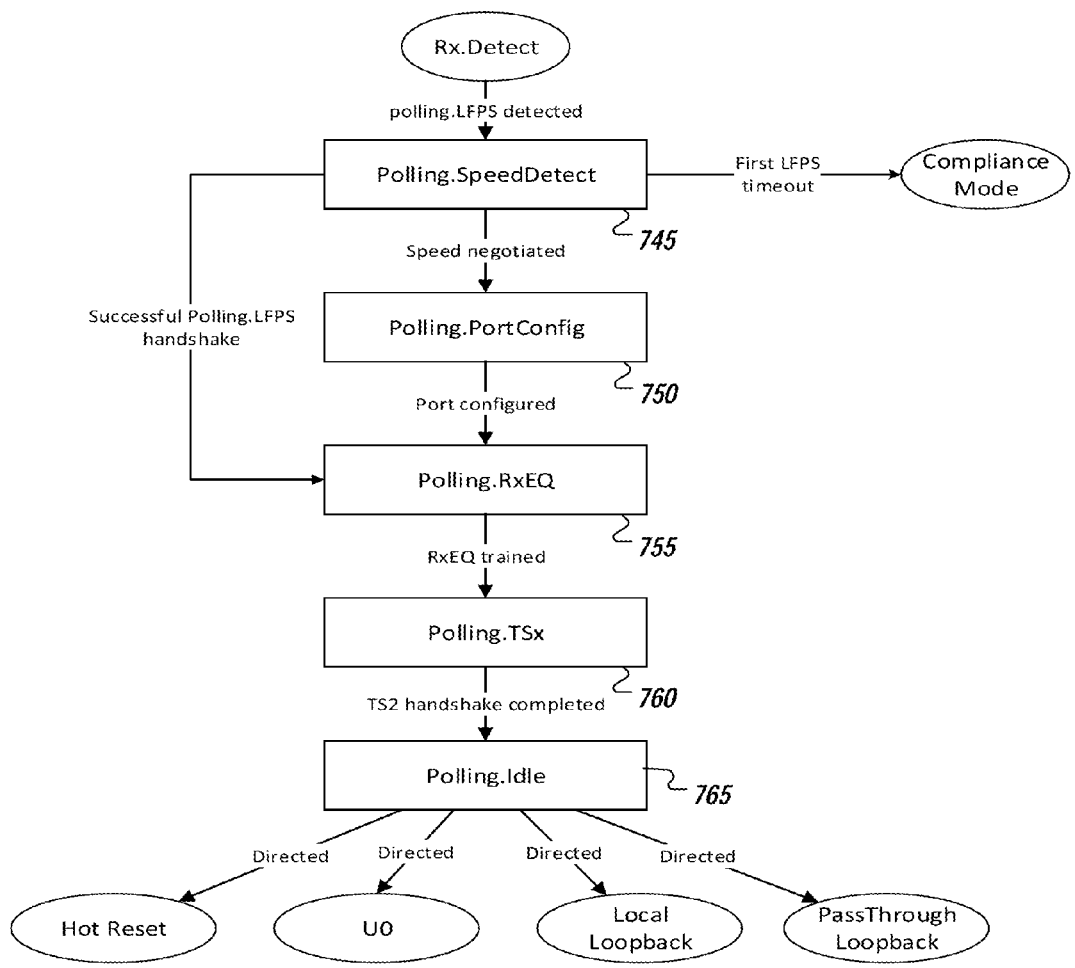
FIG. 7B illustrates an embodiment of a state machine for sub-states of a polling state in a RTSSM.

Different polling sub-states can be provided in a Polling state 415b of a retimer training state machine, such as the RTSSM of USB 3.1 that differ from the set of sub-states provided in a link training polling state (e.g., of the LTSSM of USB 3.1), as illustrated in FIG. 7B. Accordingly, different sub-states of the RTSSM may be designated to facilitate entry and exit to the non-USB mode (e.g., based on where they fall within the retimer (or link) training process, what signals are used (e.g., are LBPM signals used in an implementation that uses LBPM for entry and/or exit into the non-USB mode, etc.). For instance, a first sub-state, Polling.SpeedDetect (745), can be designated to allow entry and exit to the non-USB mode, based on an LBPM handshake. Devices can enter the non-USB mode by temporarily exiting the sub-state and returning to the same sub-state upon exiting the non-USB mode or exiting the sub-state and transitioning to a next sub-state following exit from the non-USB mode. In either instance, normal polling operation can continue following an exit from the non-USB mode (e.g., as defined in the example state machines 700a,b of FIGS. 7A-7B).

In the above (and other) examples, the devices signaling entry to and participating in a non-USB configuration mode can be a host and device (with the communication taking place between the host USB port and a device USB port), between the device and retimer, or between the host and a retimer. The channel connecting the host to the a potential device either includes no retimers, one retimer, or multiple retimers. In cases where a single retimer is included and a non-USB mode involves a host and device, the retimer acts as a bridge passing non-USB messages back and forth. It cases where the non-USB mode involves a retimer and a host USB port or a retimer and a device USB port, the communication does not pass through the retimer, as the retimer is itself the partner device in the non-USB mode. In a case where a connection exists between a host and a USB device over a channel including a retimer, the non-USB mode entry signal can identify whether the non-USB mode (and associated configuration activities) is to involve the device or the retimer. For instance, the non-USB mode entry signal/handshake, which other device on the channel (e.g., USB device or retimer) the non-USB entry request is to apply to. Further, in cases where multiple retimers are included in a channel, the non-USB entry mode signal (e.g., an LBPM) can be encoded to identify which particular retimer the LBPM (and non-USB mode handshake) is to apply to.

Figure 8A:
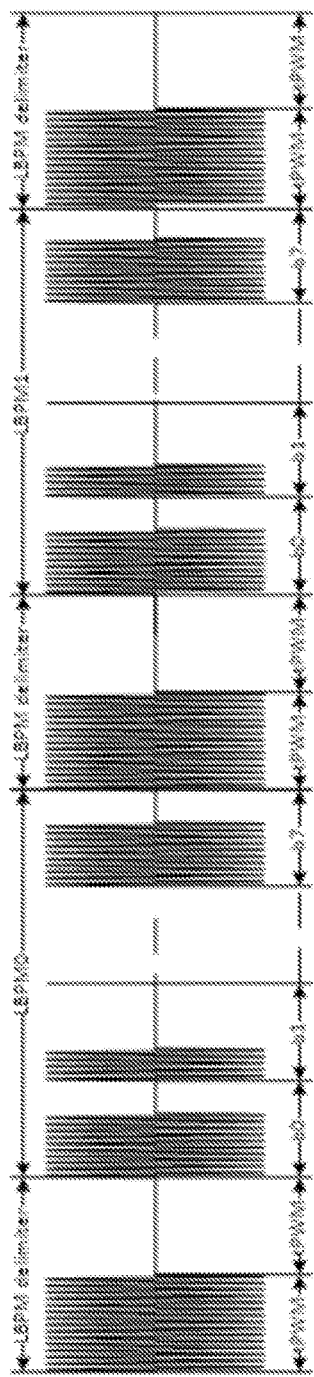
FIGS. 8A-8B are representations of example low frequency periodic signal (LFPS)-based pulse width modulation (PWM) messages (LBPMs).
Figure 8B:
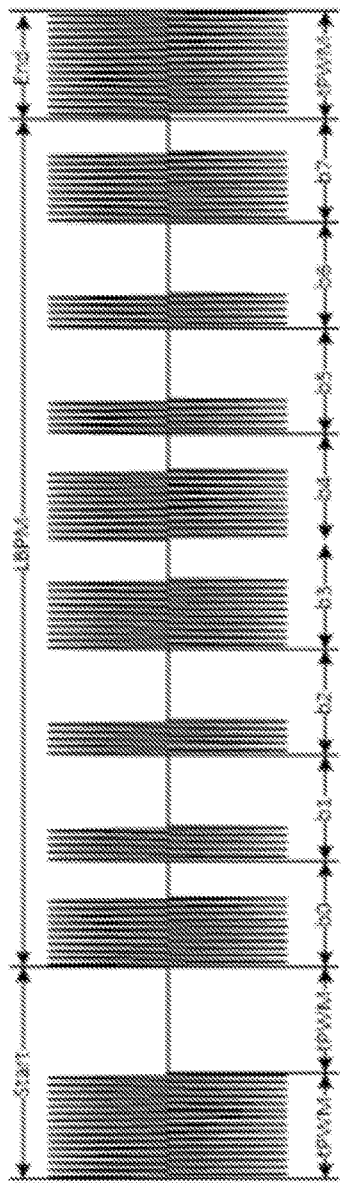

Turning to FIGS. 8A-8B, representations 800a, 800b are shown of example LBPM. Each LBPM can be based on USB compliant LFPS. For instance, in FIG. 8A, each LBPM represents a byte of information with LBPM delimiters at the beginning and the end of the byte. As shown in FIG. 8A, consecutive LBPMs may be transmitted back to back with LBPM delimiters in between. FIG. 8B shows an example of an 8-bit LBPM. In some instances, an LBPM can be encoded to indicate whether the LBPM corresponds to an entry or an exit handshake. As an illustrative example, a non-USB mode entry handshake LBPM may be defined as "0000111". In such an example, a port initiating entry to the non-USB mode can transmit a series of back to back entry handshake LBPM before switching its receiver termination and waiting for the acknowledgement from its link partner. A link partner, upon detecting one of the non-USB mode entry handshake LBPM(s), may enter non-USB mode and respond with the same non-USB mode entry LBPM to complete the handshake. In some cases, a different non-USB mode exit handshake LBPM can be defined. For instance, a non-USB mode exit handshake LBPM may be defined as "11110000". As noted, upon completing operation within the non-USB mode, the two ports may perform the non-USB Mode exit handshake by exchanging the non-USB mode exit handshake LBPMs.

Figure 9:
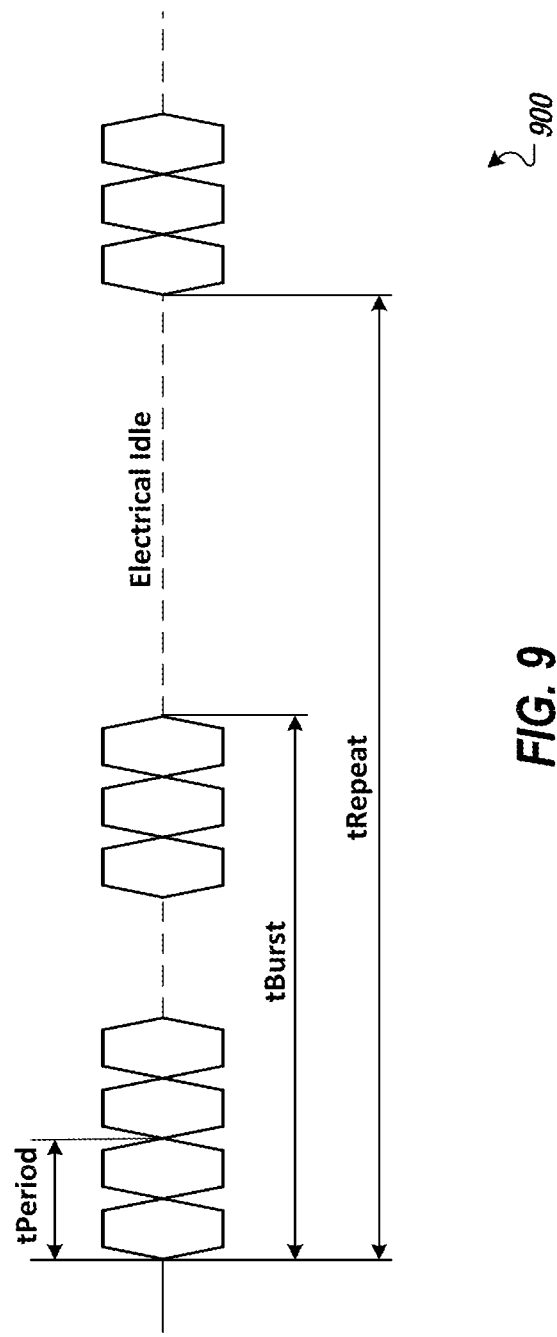
FIG. 9 is a representation of an example LFPS.

As noted, in some cases, a port can expect a first signal (e.g., Polling.LFPS signal) in normal USB operation, with non-USB mode handshake signals also possible in lieu of the first signal. Receiving the non-USB mode handshake signal instead of the first signal can cause the port to enter the non-USB mode rather than continuing with normal USB operation. For information purposes, FIG. 9 includes an illustration of a Polling.LFPS signal 900. While also defined in and readable by devices compliant with USB 3.1, the Polling.LFPS signal can be particular different than the non-USB mode handshake signal defined for the protocol, such as LBPM. For instance, the duty cycle of a Polling.LFPS can be 10% compared to duty cycles in the range of approximately 33% or 66% for LBPM.

It should be appreciated that the examples illustrated above are non-limiting example provided for purposes of illustrating certain principles. Indeed, these principles can be applied to different interconnect protocols in addition to USB. Further, signals can be employed within these protocols that are different to LBPM or other similar signals that can likewise be used as non-USB mode handshake signals. Indeed, even in other USB-specific implementations, defined signals other than LBPM can be used as a non-USB mode handshake signal. Additionally, while non-USB communications can be based on LBPM signaling, effectively any protocol or signaling method can be employed during the non-USB mode that allows the participating devices to accomplish the desired tasks within the non-USB mode using non-USB communications.

Figures 10A, 10B:
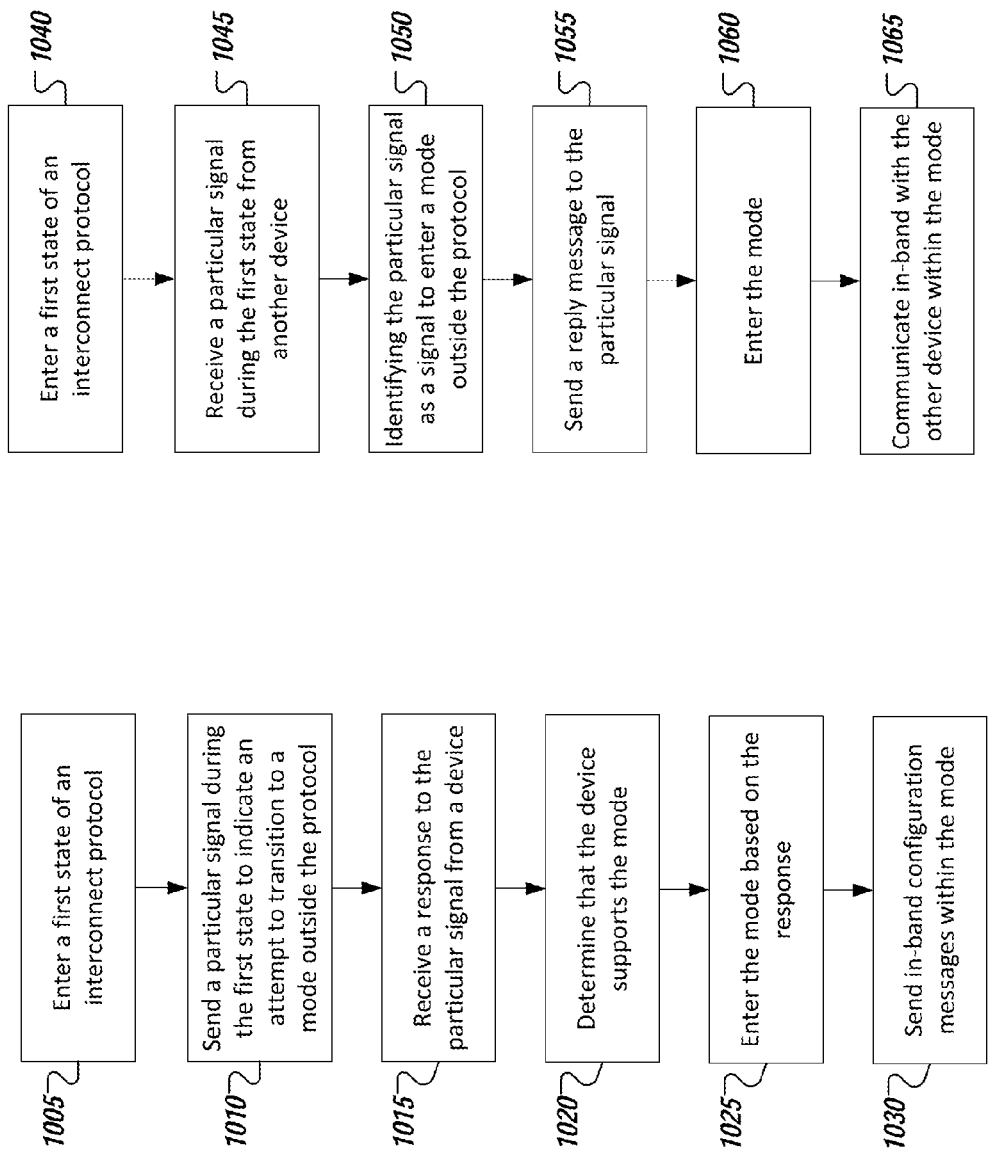
FIGS. 10A-10B are flowcharts illustrating example techniques involving a configuration mode outside of normal interconnect operation.

Turning to FIGS. 10A-10B, example flow diagrams 1000a, 1000b are presented to illustrate example techniques for providing a configuration mode outside of defined interconnect protocol. For instance, in FIG. 10A, a device can enter 1005 a first state defined in an interconnect protocol. The device can attempt to enter a configuration mode that operates and involves communication outside of the interconnect protocol. Accordingly, a particular signal can be sent 1010, within the first state, to another device in-band over a link connecting the device and the other device. Sending 1010 the particular signal within the first state can be defined as a part of an entry handshake to cause the device and other device to enter the configuration mode. The particular signal can be defined within the interconnect protocol, but within the context of another state in the interconnect protocol. A response to the particular signal can be received 1015 from the other device. The device can determine 1020 that the other device supports the configuration mode based on the response and further enter 1025 the configuration mode based on the response. The response can complete an entry handshake for the configuration mode. In-band configuration messages can be exchanged (e.g., 1030) between the device and other device while they are in the configuration mode. These signals can be signals non-compliant with or otherwise not defined by the interconnect protocol.

Turning to the example of FIG. 10B, a device, such as a peripheral device connected to a host, or a retimer in a channel connecting the host to other devices, can enter 1040 a first state defined in an interconnect protocol. A particular signal can be received 1045 from another device while in the first state. Receiving the particular signal within the first state can be identified 1050 as a signal to enter a configuration mode that operates and involves communication outside of the interconnect protocol. If the device supports the configuration mode, the device can send a reply 1055 in response to the particular signal to the other device. The reply can serve as an acknowledgement of a request to enter the configuration mode. The device can then enter 1060 the configuration mode and communicate 1065 in-band with the other device within the configuration mode. Communications within the configuration mode can fall outside of signaling and messages defined within the interconnect protocol and can be used to perform pre-configuration, system control, and other link management tasks, among other examples.

Note that the apparatus', methods', and systems described above may be implemented in any electronic device or system as aforementioned. As specific illustrations, the figures below provide exemplary systems for utilizing the principles described herein. As the systems below are described in more detail, a number of different interconnects are disclosed, described, and revisited from the discussion above. And as is readily apparent, the advances described above may be applied to any of those interconnects, fabrics, or architectures.

Figure 11:
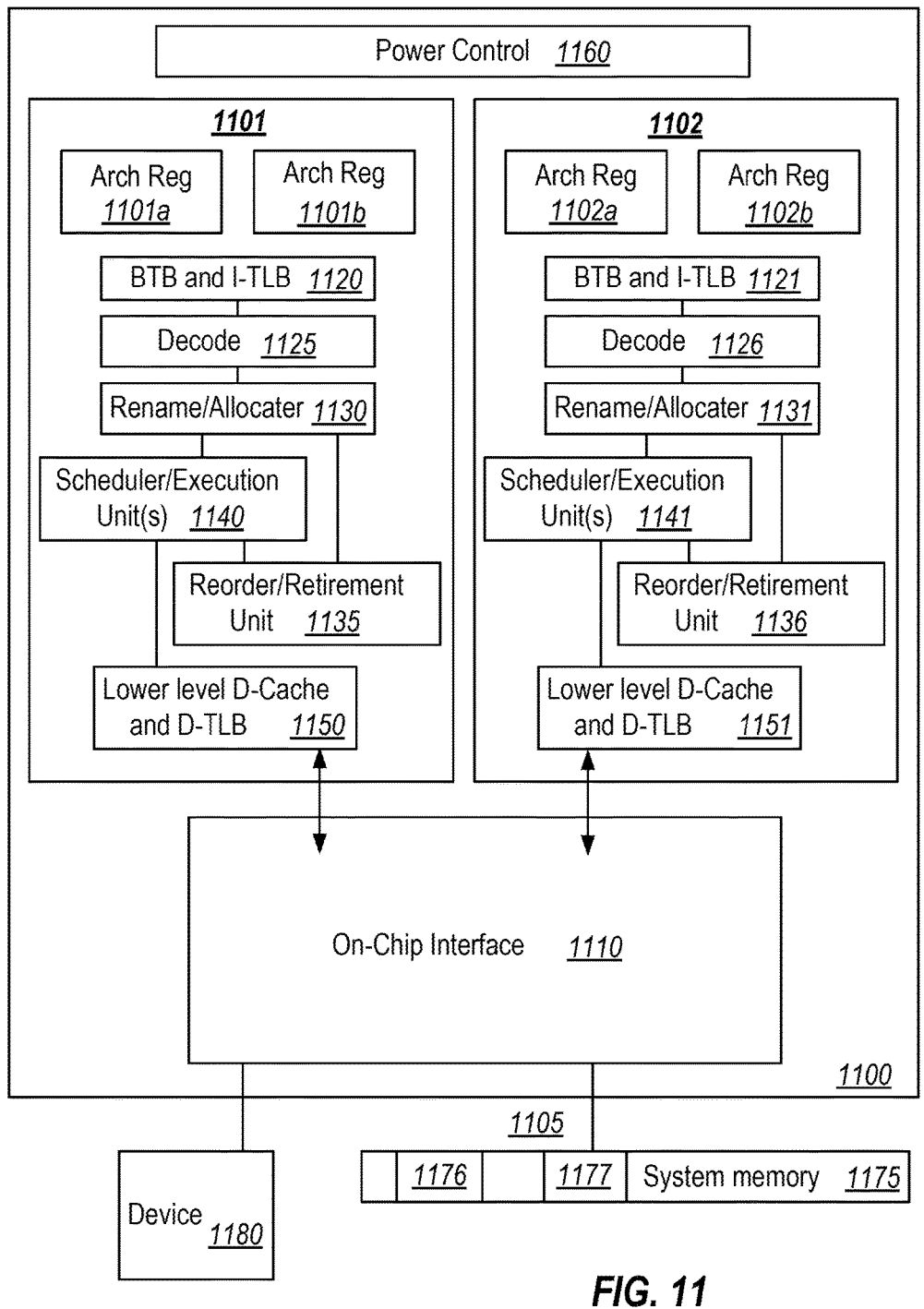
FIG. 11 illustrates an embodiment of a block diagram for a computing system including a multicore processor.

Referring now to FIG. 11, an embodiment of a block diagram for a computing system including a multicore processor is depicted. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores—core 1101 and 1102, which may include asymmetric cores or symmetric cores (the illustrated embodiment). However, processor 1100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 11, includes two cores—core 1101 and 1102. Here, core 1101 and 1102 are considered symmetric cores, i.e. cores with the same configurations, functional units, and/or logic. In another embodiment, core 1101 includes an out-of-order processor core, while core 1102 includes an in-order processor core. However, cores 1101 and 1102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 1101 are described in further detail below, as the units in core 1102 operate in a similar manner in the depicted embodiment.

As depicted, core 1101 includes two hardware threads 1101a and 1101b, which may also be referred to as hardware thread slots 1101a and 1101b. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101a, a second thread is associated with architecture state registers 1101b, a third thread may be associated with architecture state registers 1102a, and a fourth thread may be associated with architecture state registers 1102b. Here, each of the architecture state registers (1101a, 1101b, 1102a, and 1102b) may be referred to as processing elements, thread slots, or thread units, as described above. As illustrated, architecture state registers 1101a are replicated in architecture state registers 1101b, so individual architecture states/contexts are capable of being stored for logical processor 1101a and logical processor 1101b. In core 1101, other smaller resources, such as instruction pointers and renaming logic in allocator and renamer block 1130 may also be replicated for threads 1101a and 1101b. Some resources, such as re-order buffers in reorder/retirement unit 1135, ILTB 1120, load/store buffers, and queues may be shared through partitioning. Other resources, such as general purpose internal registers, page-table base register(s), low-level data-cache and data-TLB 1115, execution unit(s) 1140, and portions of out-of-order unit 1135 are potentially fully shared.

Processor 1100 often includes other resources, which may be fully shared, shared through partitioning, or dedicated by/to processing elements. In FIG. 11, an embodiment of a purely exemplary processor with illustrative logical units/resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125 coupled to fetch unit 1120 to decode fetched elements. Fetch logic, in one embodiment, includes individual sequencers associated with thread slots 1101a, 1101b, respectively. Usually core 1101 is associated with a first ISA, which defines/specifies instructions executable on processor 1100. Often machine code instructions that are part of the first ISA include a portion of the instruction (referred to as an opcode), which references/specifies an instruction or operation to be performed. Decode logic 1125 includes circuitry that recognizes these instructions from their opcodes and passes the decoded instructions on in the pipeline for processing as defined by the first ISA. For example, as discussed in more detail below decoders 1125, in one embodiment, include logic designed or adapted to recognize specific instructions, such as transactional instruction. As a result of the recognition by decoders 1125, the architecture or core 1101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1126, in one embodiment, recognize the same ISA (or a subset thereof). Alternatively, in a heterogeneous core environment, decoders 1126 recognize a second ISA (either a subset of the first ISA or a distinct ISA).

In one example, allocator and renamer block 1130 includes an allocator to reserve resources, such as register files to store instruction processing results. However, threads 1101*a* and 1101*b* are potentially capable of out-of-order execution, where allocator and renamer block 1130 also reserves other resources, such as reorder buffers to track instruction results. Unit 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150 are coupled to execution unit(s) 1140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1101 and 1102 share access to higher-level or further-out cache, such as a second level cache associated with on-chip interface 1110. Note that higher-level or further-out refers to cache levels increasing or getting further way from the execution unit(s). In one embodiment, higher-level cache is a last-level data cache—last cache in the memory hierarchy on processor 1100—such as a second or third level data cache. However, higher level cache is not so limited, as it may be associated with or include an instruction cache. A trace cache—a type of instruction cache—instead may be coupled after decoder 1125 to store recently decoded traces. Here, an instruction potentially refers to a macro-instruction (i.e. a general instruction recognized by the decoders), which may decode into a number of micro-instructions (micro-operations).

In the depicted configuration, processor 1100 also includes on-chip interface module 1110. Historically, a memory controller, which is described in more detail below, has been included in a computing system external to processor 1100. In this scenario, on-chip interface 1110 is to communicate with devices external to processor 1100, such as system memory 1175, a chipset (often including a memory controller hub to connect to memory 1175 and an I/O controller hub to connect peripheral devices), a memory controller hub, a northbridge, or other integrated circuit. And in this scenario, bus 1105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1175 may be dedicated to processor 1100 or shared with other devices in a system. Common examples of types of memory 1175 include DRAM, SRAM, non-volatile memory (NV memory), and other known storage devices. Note that device 1180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1100. For example in one embodiment, a memory controller hub is on the same package and/or die with processor 1100. Here, a portion of the core (an on-core portion) 1110 includes one or more controller(s) for interfacing with other devices such as memory 1175 or a graphics device 1180. The configuration including an interconnect and controllers for interfacing with such devices is often referred to as an on-core (or un-core configuration). As an example, on-chip interface 1110 includes a ring interconnect for on-chip communication and a high-speed serial point-to-point link 1105 for off-chip communication. Yet, in the SOC environment, even more devices, such as the network interface, co-processors, memory 1175, graphics processor 1180, and any other known computer devices/interface may be integrated on a single die or integrated circuit to provide small form factor with high functionality and low power consumption.

In one embodiment, processor 1100 is capable of executing a compiler, optimization, and/or translator code 1177 to compile, translate, and/or optimize application code 1176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 12:
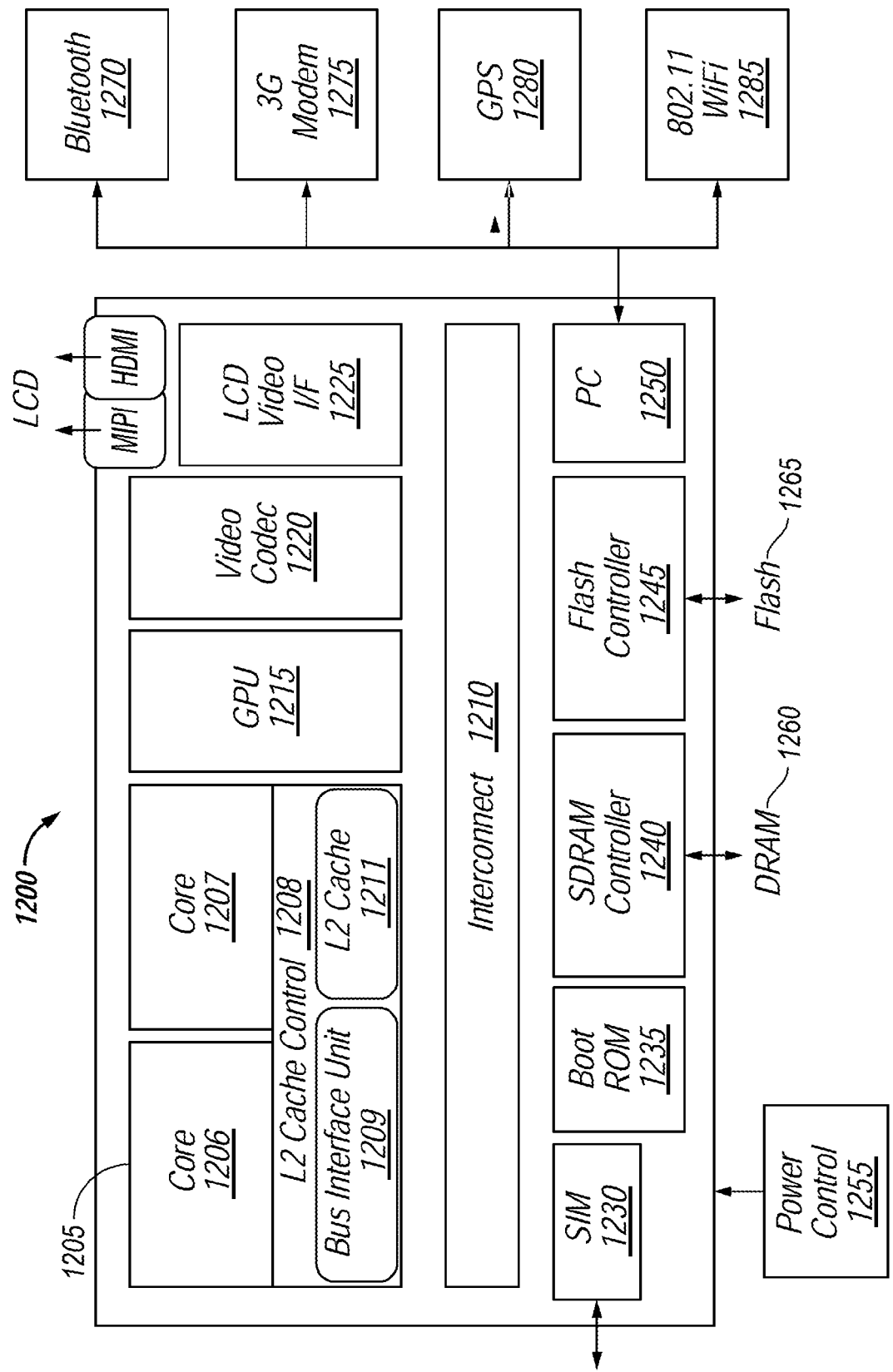
FIG. 12 illustrates another embodiment of a block diagram for a computing system.

Turning next to FIG. 12, an embodiment of a system on-chip (SOC) design in accordance with the inventions is depicted. As a specific illustrative example, SOC 1200 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1200 includes 2 cores—1206 and 1207. Similar to the discussion above, cores 1206 and 1207 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1206 and 1207 are coupled to cache control 1208 that is associated with bus interface unit 1209 and L2 cache 1211 to communicate with other parts of system 1200. Interconnect 1210 includes an on-chip interconnect, such as an IOSF, AMBA, or other interconnect discussed above, which potentially implements one or more aspects of described herein.

Interconnect 1210 provides communication channels to the other components, such as a Subscriber Identity Module (SIM) 1230 to interface with a SIM card, a boot rom 1235 to hold boot code for execution by cores 1206 and 1207 to initialize and boot SOC 1200, a SDRAM controller 1240 to interface with external memory (e.g. DRAM 1260), a flash controller 1245 to interface with non-volatile memory (e.g. Flash 1265), a peripheral control 1250 (e.g. Serial Peripheral Interface) to interface with peripherals, video codecs 1220 and Video interface 1225 to display and receive input (e.g. touch enabled input), GPU 1215 to perform graphics related computations, etc. Any of these interfaces may incorporate aspects of the invention described herein.

In addition, the system illustrates peripherals for communication, such as a Bluetooth module 1270, 3G modem 1275, GPS 1285, and WiFi 1285. Note as stated above, a UE includes a radio for communication. As a result, these peripheral communication modules are not all required. However, in a UE some form a radio for external communication is to be included.

Figure 13:
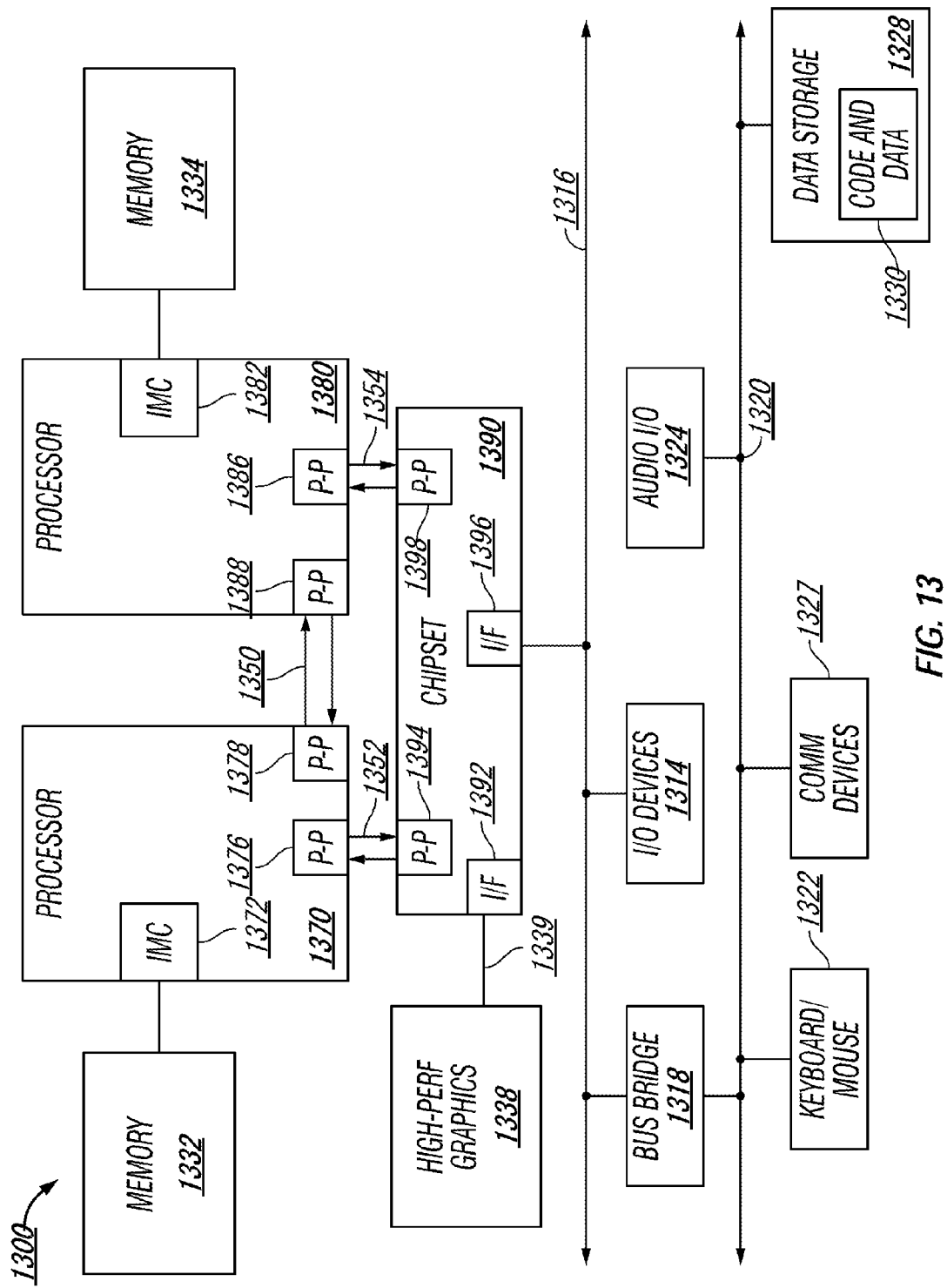
FIG. 13 illustrates an embodiment of a block for a computing system including multiple processor sockets.

Referring now to FIG. 13, shown is a block diagram of a second system 1300 in accordance with an embodiment of the present invention. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of a processor. In one embodiment, 1352 and 1354 are part of a serial, point-to-point coherent interconnect fabric, such as a high-performance architecture. As a result, the invention may be implemented within the QPI architecture.

While shown with only two processors 1370, 1380, it is to be understood that the scope of the present invention is not so limited. In other embodiments, one or more additional processors may be present in a given processor.

Processors 1370 and 1380 are shown including integrated memory controller units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 each exchange information with a chipset 1390 via individual P-P interfaces 1352, 1354 using point to point interface circuits 1376, 1394, 1386, 1398. Chipset 1390 also exchanges information with a high-performance graphics circuit 1338 via an interface circuit 1392 along a high-performance graphics interconnect 1339.

A shared cache (not shown) may be included in either processor or outside of both processors; yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 13, various I/O devices 1314 are coupled to first bus 1316, along with a bus bridge 1318 which couples first bus 1316 to a second bus 1320. In one embodiment, second bus 1320 includes a low pin count (LPC) bus. Various devices are coupled to second bus 1320 including, for example, a keyboard and/or mouse 1322, communication devices 1327 and a storage unit 1328 such as a disk drive or other mass storage device which often includes instructions/code and data 1330, in one embodiment. Further, an audio I/O 1324 is shown coupled to second bus 1320. Note that other architectures are possible, where the included components and interconnect architectures vary. For example, instead of the point-to-point architecture of FIG. 13, a system may implement a multi-drop bus or other such architecture.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. One or more embodiments may provide an apparatus, a system, a machine readable storage, a machine readable medium, hardware- and/or software-based logic, and a method to enter a first state and to support a set of core configuration modes (e.g., using state logic), send a particular signal to a device over a link during the first state (e.g., using a transmitter), detect that a response to the particular signal is received in the first state (e.g., using detection logic), determine that the device supports a particular configuration mode outside the core configuration modes based on the response, enter the particular configuration mode based on the response, and send one or more in-band configuration messages to the device within the particular configuration mode (e.g., using configuration logic).

In at least one example, the particular signal is sent to signal an attempt to enter the particular configuration mode with the device.

In at least one example, the particular signal is used within at least one other state of the state machine of the protocol.

In at least one example, the particular signal is for use in link training within at least one of the other states.

In at least one example, failure to receive a response is to indicate that the device does not support the particular configuration mode.

In at least one example, timer logic can be included that maintains a timer value to determine whether a response is received within a particular time window.

In at least one example, a second state in the set of core configuration modes is to be entered based on the failure to receive the response.

In at least one example, the first state comprises a receiver detect state and the other state comprises a polling state.

In at least one example, the first state comprises a polling state and the second state comprises a different state.

In at least one example, the first state is one of a plurality of states in a link training state machine.

In at least one example, the first state is one of a plurality of states in a retimer training state machine.

In at least one example, the set of core configuration modes includes a Universal Serial Bus (USB) protocol. The protocol can be USB 3.1 and the particular signal can be based on a Low Frequency Periodic Signal (LFPS)-based pulse width modulation (PWM) message (LBPM). The particular configuration mode can be a non-USB mode.

One or more embodiments may provide a USB host port with state logic to send a Low Frequency Periodic Signal (LFPS)-based pulse width modulation (PWM) message (LBPM) to a retimer device connected to the USB host in a channel to connect the USB host to USB devices, where the LBPM is to be sent in a particular state included in a retimer training state machine compliant with a version of USB specification, determine whether the retimer device supports a non-USB configuration mode based on whether a reply is received to the LBPM, enter the non-USB configuration mode in response to a reply, and send in-band non-USB signals within the configuration mode.

In at least one example, the sent LBPM and the reply comprise a handshake to enter the non-USB configuration mode.

In at least one example, the reply comprises an LBPM. The LBPM can be encoded to indicate that the LBPM applies to the retimer.

In at least one example, the particular state is a receiver detect state.

In at least one example, the particular state is a polling state.

In at least one example, the version of USB specification is USB 3.1.

In at least one example, the USB host is a system on chip (SoC).

In at least one example, the USB host is a chipset.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the subject matter set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
    a retimer comprising:
        state logic to enter a receiver detect state defined in a particular protocol, wherein a physical link is to be monitored for termination of a receiver of a device on the link during the receiver detect state, wherein the receiver detect state is one of a plurality of states in a retimer training state machine;
        a transmitter to send a particular signal to the device over the link during the receiver detect state, wherein the particular signal comprises a Low Frequency Periodic Signal (LFPS)-based pulse width modulation (PWM) message (LBPM);
        detection logic to detect that a response to the particular signal is received in the receiver detect state;
        configuration mode logic to:
            determine that the device supports a particular configuration mode outside the particular protocol based on the response;
            enter the particular configuration mode based on the response; and
            send one or more in-band configuration messages to the device within the particular configuration mode.

2. The apparatus of claim 1, wherein the particular signal is sent to signal an attempt to enter the particular configuration mode with the device.

3. The apparatus of claim 1, wherein the particular signal is to be also used within one or more other configuration modes of the particular protocol.

4. The apparatus of claim 3, wherein the particular signal is for use in link training within at least one of the other states.

5. The apparatus of claim 1, wherein failure to receive a response is to indicate that the device does not support the particular configuration mode.

6. The apparatus of claim 5, further comprising timer logic to maintain a timer value to determine whether a response is received within a particular time window.

7. The apparatus of claim 5, wherein a second state of the particular protocol is to be entered based on the failure to receive the response.

8. The apparatus of claim 7, wherein the other state comprises a polling state.

9. The apparatus of claim 1, wherein the receiver detect state is one of a plurality of states in a link training state machine of the particular protocol.

10. The apparatus of claim 1, wherein the particular protocol comprises a Universal Serial Bus (USB) protocol.

11. The apparatus of claim 10, wherein the USB protocol comprises USB 3.1.

12. The apparatus of claim 10, wherein the particular configuration mode is a non-USB mode.

13. An apparatus comprising:
state logic of a Universal Serial Bus (USB) host port to:
send a Low Frequency Periodic Signal (LFPS)-based pulse width modulation (PWM) message (LBPM) to a retimer device physically connected to the USB host in a channel to physically connect the USB host to USB devices, wherein the LBPM is to be sent in a receiver detect state included in a retimer training state machine compliant with a version of USB specification;
determine whether the retimer device supports a non-USB configuration mode based on whether a reply is received to the LBPM;
enter the non-USB configuration mode in response to a particular reply from the retimer device; and
send in-band non-USB signals within the configuration mode.

14. The apparatus of claim 13, wherein the sent LBPM and the particular reply comprise a handshake to enter the non-USB configuration mode.

15. The apparatus of claim 14, wherein the particular reply comprises an LBPM.

16. The apparatus of claim 13, wherein the LBPM is encoded to indicate that the LBPM applies to the retimer.

17. The apparatus of claim 13, wherein the version of USB specification comprises USB 3.1.

18. The apparatus of claim 13, wherein the USB host comprises a system on chip (SoC).

19. The apparatus of claim 13, wherein the USB host comprises a chipset.

20. A method comprising:
entering a receiver detect state of a particular interconnect protocol, wherein a physical link is to be monitored for termination of a receiver of a device on the link during the receiver detect state, wherein the receiver detect state is one of a plurality of states in a retimer training state machine;
sending a particular signal to the device over the link during the receiver detect state, wherein the particular signal comprises a Low Frequency Periodic Signal (LFPS)-based pulse width modulation (PWM) message (LBPM);
detecting, during the receiver detect state, that a response to the particular signal is received in the receiver detect state;
determining that the device supports a configuration mode outside the particular protocol based on the received response;
entering the configuration mode based on the response; and
sending one or more in-band configuration messages within the configuration mode.

21. A system comprising:
a device comprising logic to:
enter a receiver detect state of a particular interconnect protocol, wherein a physical link is to be monitored for termination of a receiver on the link during the receiver detect state;
send a particular signal on the link during the receiver detect state to enter a configure mode outside the particular protocol, wherein the particular signal comprises a Low Frequency Periodic Signal (LFPS)-based pulse width modulation (PWM) message (LBPM);
detect that a response to the particular signal is received in the receiver detect state;
determine, from the response, that a retimer on the link supports a configuration mode outside the protocol based on the response;
enter the configuration mode based on the response; and
send one or more in-band configuration messages to the retimer within the configuration mode; and
the link to connect a port of the device to another device, wherein the link comprises the retimer and the retimer comprises logic to enter the configuration mode based on receipt of the particular signal in the receiver detect state and participate in communications with the device in the configuration mode.

* * * * *